(12) United States Patent
Huang et al.

(10) Patent No.: US 8,052,292 B2
(45) Date of Patent: Nov. 8, 2011

(54) FLASH ASSEMBLY HAVING CONNECTING MEMBERS ON CIRCUIT BOARD TO ELECTRICALLY CONNECTED TO FLASH UNIT

(75) Inventors: Heng-Hsin Huang, Taipei Hsien (TW); Shu-Fan Wang, Taipei Hsien (TW); Jun-Han Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 394 days.

(21) Appl. No.: 12/411,355

(22) Filed: Mar. 25, 2009

(65) Prior Publication Data
US 2010/0061075 A1 Mar. 11, 2010

(30) Foreign Application Priority Data

Sep. 11, 2008 (CN) .......................... 2008 1 0304469

(51) Int. Cl.
G03B 15/03 (2006.01)
F21V 17/10 (2006.01)
F21V 23/06 (2006.01)
F21V 15/01 (2006.01)
H05K 1/00 (2006.01)
H01J 5/56 (2006.01)

(52) U.S. Cl. ............... 362/16; 362/217.13; 362/222; 362/362; 362/646; 439/56; 439/612

(58) Field of Classification Search .............. 362/16–18; 439/56, 612; 396/176, 200
See application file for complete search history.

(56) References Cited

U.S. PATENT DOCUMENTS

| 3,172,345 | A | * | 3/1965 | Jakob et al. ................... 396/176 |
| 4,109,301 | A | * | 8/1978 | Wakimura ....................... 362/16 |
| 4,404,618 | A | * | 9/1983 | Yamada et al. ................. 362/17 |
| 4,928,210 | A | * | 5/1990 | Hayakawa et al. ...... 362/217.14 |
| 5,003,330 | A | * | 3/1991 | Kotani et al. ................. 396/176 |
| 5,913,083 | A | * | 6/1999 | Allen ............................ 396/176 |
| 6,697,572 | B2 | * | 2/2004 | Manabe et al. ............... 396/176 |
| 2002/0048461 | A1 | * | 4/2002 | Tanaka ........................ 396/539 |
| 2008/0160822 | A1 | | 7/2008 | Ikeda et al. |

FOREIGN PATENT DOCUMENTS

CN 1577043 A 2/2005
JP 200075366 A 3/2000

* cited by examiner

*Primary Examiner* — Alan Cariaso
(74) *Attorney, Agent, or Firm* — Altis Law Group, Inc.

(57) ABSTRACT

A flash assembly includes a circuit board unit, a flash unit, and a housing. The circuit board unit includes a circuit board and two connecting members electrically disposed on the circuit board. Each connecting member defines a gap. The flash unit includes a reflector and a flash tube received in the reflector and electrically connected to the reflector. The flash tube includes two power electrodes received in the corresponding gaps and electrically connected to the circuit board by the connecting members. The flash unit and the circuit board unit are received in the housing.

11 Claims, 4 Drawing Sheets

FLASH ASSEMBLY HAVING CONNECTING MEMBERS ON CIRCUIT BOARD TO ELECTRICALLY CONNECTED TO FLASH UNIT

BACKGROUND

1. Technical Field

The disclosure relates to flash assemblies and, particularly, to a flash assembly for a portable electronic device.

2. Description of the Related Art

Portable electronic devices, such as film cameras, digital cameras, and mobile phones equipped with a camera module, typically employ a flash assembly to illuminate an object in low lighting conditions. Typically the flash assembly has a flash tube with two power electrodes and a circuit board. The power electrodes of the flash tube are connected to the circuit board by wires for assembling the flash tube to the circuit board. However, such flash assembly is complex in structure and inconvenient to be assembled in a portable electronic device.

Accordingly, it is desirable to provide a flash assembly for a portable electronic device which can overcome the above-mentioned problem.

DETAILED DESCRIPTION

Embodiments of the disclosure will now be described in detail with reference to the accompanying drawings.

Figure 1:
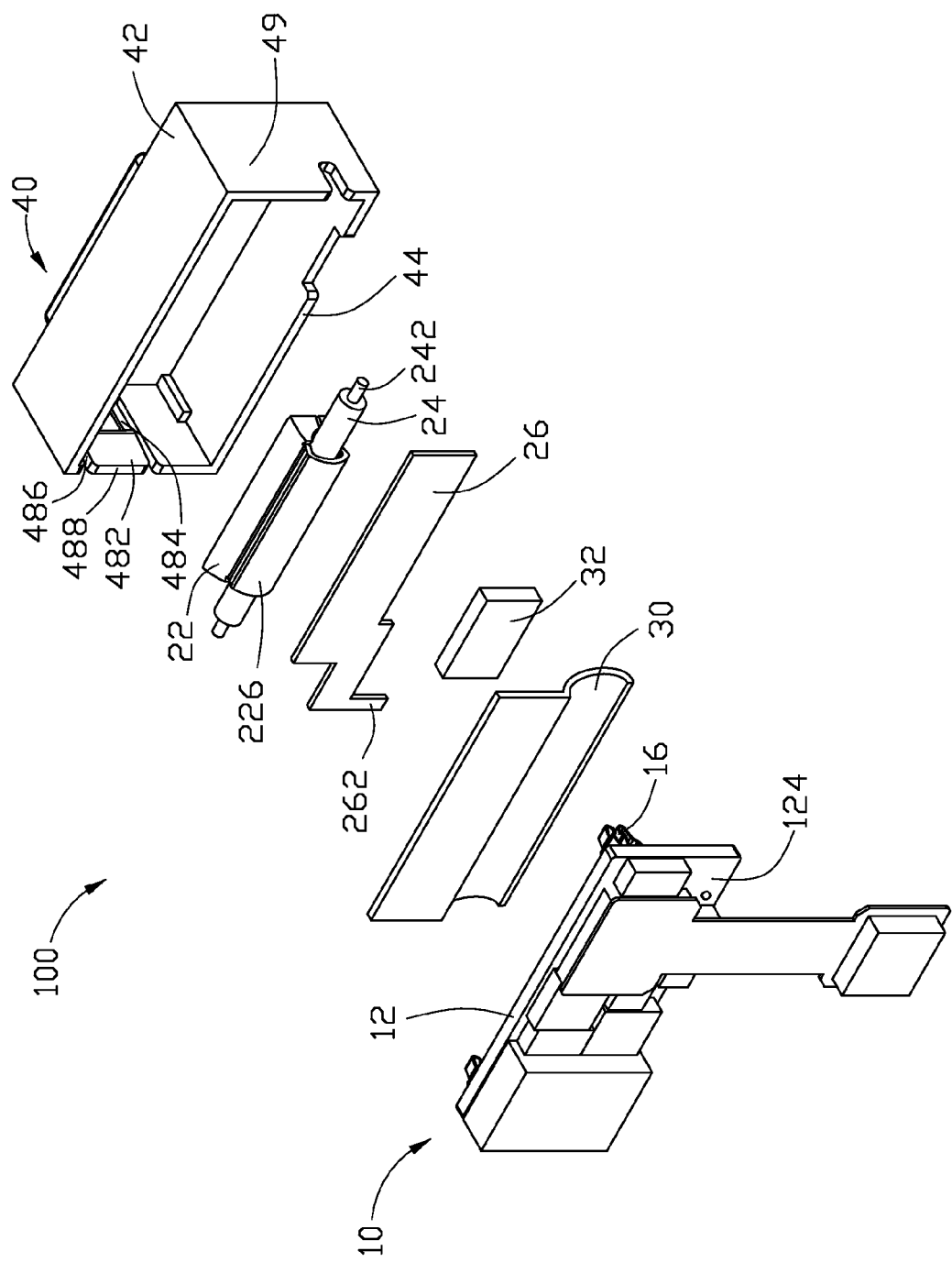
FIG. 1 is an exploded view of a flash assembly according to one embodiment of the disclosure.
Figure 2:
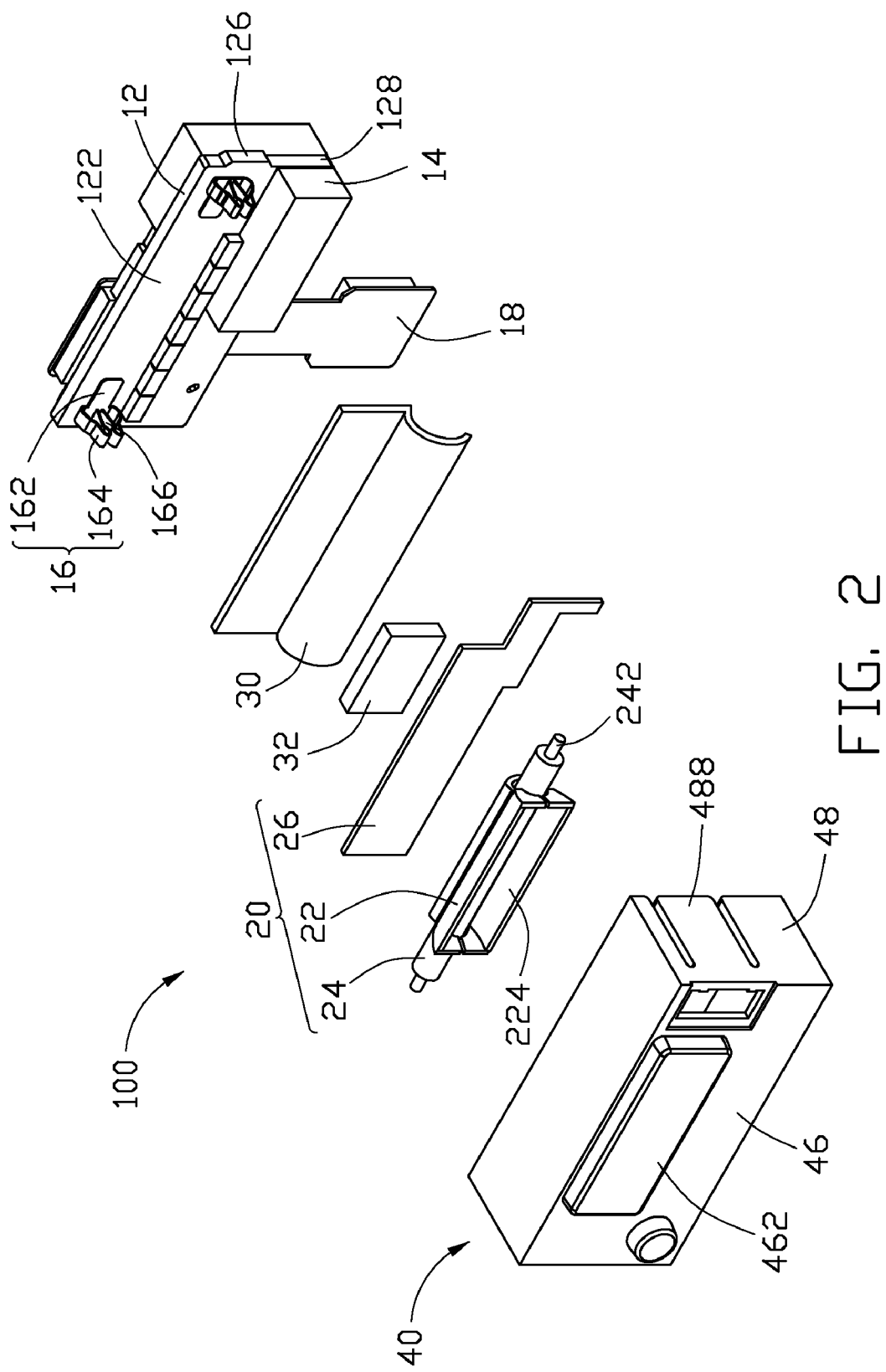
FIG. 2 is similar to FIG. 1, but showing the flash assembly from another angle.

Referring to FIGS. 1-2, a flash assembly 100 according to one embodiment is shown. The flash assembly 100 includes a circuit board unit 10, a flash unit 20, and a housing 40. The circuit board unit 10 and the flash unit 20 are received in the housing 40.

The circuit board unit 10 includes a circuit board 12, an electronic element unit 14, two connecting members 16, and a flexible print circuit board (FPC) 18. The circuit board 12 includes a first surface 122, a second surface 124 opposite to the first surface, and a side surface 128 connecting the first and second surfaces 122 and 124. A protrusion 126 is disposed on the side surface 128 of the circuit board 12 for matching with one sidewall of the housing 40. The electronic element unit 14 and the connecting member 16 are electrically disposed on the first surface 122 of the circuit board 12. The FPC 18 is electrically disposed on the second surface 124 of the circuit board 12 and configured for electrically connecting to a portable electronic device.

The electronic element unit 14 is configured for providing power to a boosting circuit (not shown) of the circuit board 12 to achieve a high voltage. The electronic element unit 14 may include a number of elements such as capacitors, resistors, and inductors.

Each connecting member 16 includes a base 162 and two elastic members 164. The elastic members 164 upwardly extend from two opposite sidewalls of the base 162 to define a gap 166 between the elastic members 164. The elastic members 164 are made of an elastic material for optionally adjusting the size of the gap 166. The base 162 is electrically connected on the first surface 122 of the circuit board 12. In the exemplary embodiment, the base 162 is welded on the first surface 122 of the circuit board 12. The elastic members 164 and the base 162 are made a conducting material such as copper.

The flash unit 20 includes a reflector 22, a flash tube 24, and a triggering electrode 26. The triggering electrode 26 is electrically connected to the reflector 22. The flash tube 24 is received in the reflector 22 and electrically connected to the reflector 22. In the embodiment, the flash tube 24 is circular, a conducting film (not shown) is coated on the outer of the flash tube 24 for electrically connecting the flash tube 24 to the reflector 22. The flash tube 24 may be filled with a noble gas, such as xenon gas, and configured to create a bright flash when energized by a high voltage pulse. The flash tube 24 includes two power electrodes 242 protruded outwardly from opposite ends of the flash tube 24. The reflector 22 defines an opening 224 to allow the flash of light to be concentrated and includes an end surface 226 opposite the opening 224. The triggering electrode 26 is glued to the end surface 226 of the reflector 22 and electrically connected to the reflector 22. In the embodiment, the triggering electrode 26 is electrically connected to the reflector 22 by a conducting adhesive (not shown). An end 262 of the triggering electrode 26 is electrically connected to the boosting circuit of the circuit board 12 for providing a high voltage to the flash tube 24.

Figure 3:
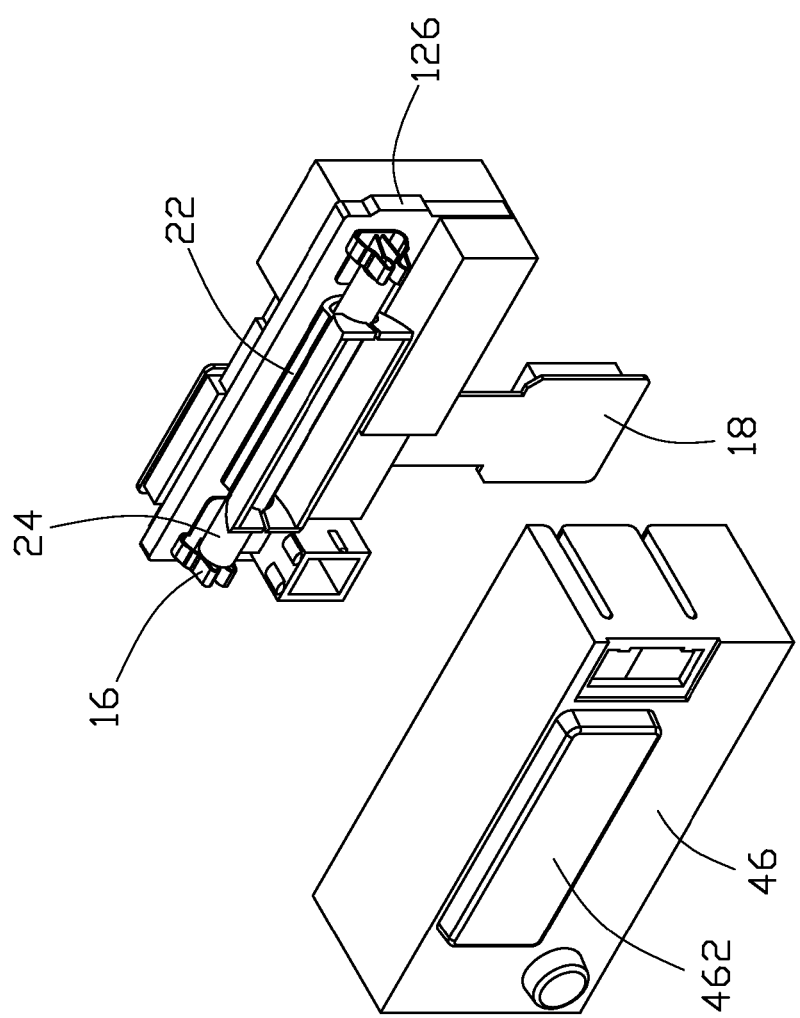
FIG. 3 is a partially exploded view of the flash assembly of FIG. 1.

Referring to FIG. 3, when the flash unit 20 is assembled with the circuit board 12, the reflector 22 is disposed between the two connecting members 164, the power electrodes 242 are received in the corresponding gap 166 of the elastic member 164 for electrically connecting the flash tube 24 to the circuit board 12.

When a high voltage is applied on the end 262 of the triggering electrode 26, the circuit board 12 is electrically conducted with the reflector 22, the reflector 22 is electrically conducted with the flash tube 24 via the conducting film, the high voltage ionizes the gas filled in the flash tube 24 so that the two power electrodes 242 of the flash tube 24 are conducted via the ionized gas to create a bright flash.

Figure 4:
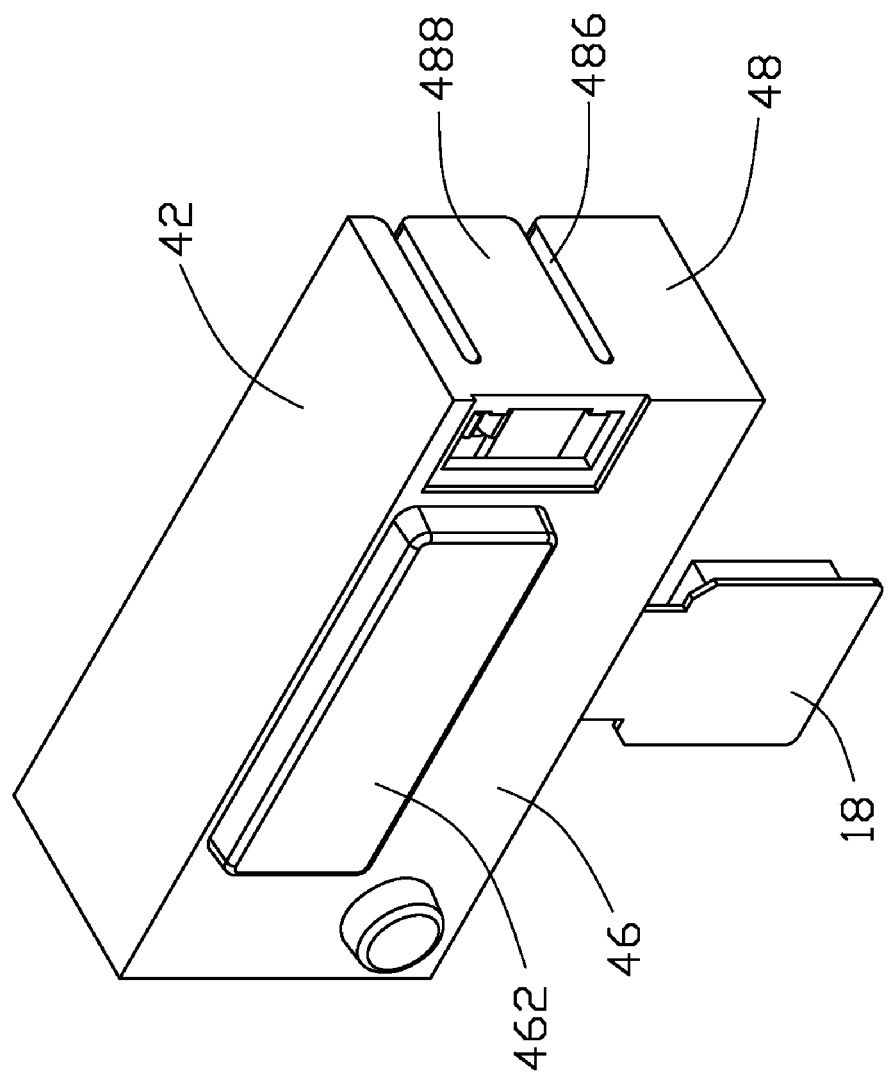
FIG. 4 is an assembly view of the flash assembly of FIG. 1.

Referring also to FIG. 4, the housing 40 includes a top wall 42, a bottom wall 44, a front wall 46, a first sidewall 48 corresponding to the side surface 128 of the circuit board 12 and a second sidewall 49. The top wall 42, the first sidewall 48, the bottom wall 44, and the second sidewall 49 are connected in sequence. A shield 462 is disposed on the front wall 46 for covering with the opening 224 of the reflector 22. The shield 462 is made of a transparent material, such as transparent glass and transparent plastic. In the embodiment, the shield 462 is a bay window.

Two slots 486 are disposed in the first sidewall 48 to form a tongue 488. The tongue 488 includes an inner surface 482 facing the second sidewall 49 of the housing 40. A receiving space 484 is disposed in the inner surface 482 of the tongue 488 for receiving the protrusion 126 of the circuit board 12. In assembling the circuit board 12 into the housing 40, the protrusion 126 is resisted with the tongue 488 outwardly for that the protrusion 126 is received in the receiving space 484, thereby the circuit board unit 10 is received in the housing 40.

It is to be understood, for facilitating assembly of the circuit board unit 10 with the housing 40, a protrusion can be disposed on another side surface of the circuit board 12 opposite the side surface 128, the second sidewall 49 of the housing can be same with the first sidewall 48 in structure. The protrusion of another surface of the circuit board 12 is matched with the second sidewall 49 of the housing 40.

Referring back to FIGS. 1-2, an insulating board 30 is disposed between the triggering electrode 26 and the circuit board unit 10 to prevent the triggering electrode 26 from electrically connecting to some irrelevant electrical elements disposed on the circuit board 12. To ensure the triggering electrode 26 firmly match with the insulating board 30, a washer 32 is disposed between the triggering electrode 26 and the insulating board 30. The washer 32 may be made of an insulating material. In the embodiment, the washer 32 is made of foam.

The two power electrodes 242 can be fixed to the circuit board 12 by the corresponding two elastic members 162 so that the flash tube 24 is easily assembled to the circuit board 12. The circuit board 12 is received in the housing 40 by the protrusion 126 latched with the receiving groove 484 of the housing 40, thereby it is simple in structure and convenient to assemble the flash assembly 100.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A flash assembly comprising:
   a circuit board unit comprising a circuit board and two connecting members electrically disposed on the circuit board, each connecting member defining a gap;
   a flash unit comprising a reflector and a flash tube received in the reflector and electrically connected to the reflector, the flash tube comprising two power electrodes received in the corresponding gaps and electrically connected to the circuit board by the connecting members; and
   a housing configured for receiving the flash unit and the circuit board, the housing comprising a top wall, a bottom wall, a front wall, a first sidewall and a second sidewall, the top wall, the first sidewall, the bottom wall, and the second sidewall being connected in sequence;
   wherein the circuit board further comprises a side surface corresponding to the first sidewall of the housing, a protrusion is disposed on the side surface of the circuit board, two slots are defined in the first sidewall of the housing to form a tongue, the tongue comprises an inner surface facing the second sidewall of the housing, a receiving space is defined in the inner surface of the first sidewall for receiving the protrusion of the circuit board.

2. The flash assembly of claim 1, wherein the circuit board unit further comprises an electronic element unit and a flexible print circuit board (FPC), the circuit board comprising a first surface and an opposite second surface, the electronic element unit and the connecting members being electrically disposed on the first surface of the circuit board, the FPC being electrically disposed on the second surface of the circuit board.

3. The flash assembly of claim 2, wherein each connecting member comprises a base and two elastic members, the elastic members upwardly extending from two opposite sidewalls of the base to define the gap between the elastic members, the base being electrically connected to the first surface of the circuit board.

4. The flash assembly of claim 3, wherein the elastic members are integrally formed on the base.

5. The flash assembly of claim 4, wherein the elastic members and the base are made of conducting material.

6. The flash assembly of claim 1, wherein the flash unit further comprises a triggering electrode, the flash tube being received in the reflector and electrically connected to the reflector, the reflector defines an opening and comprising an end surface opposite to the opening, the triggering electrode being glued to the end surface of the reflector and electrically connected to the reflector.

7. The flash assembly of claim 1, wherein a shield is disposed on the front wall and covered the opening of the reflector.

8. The flash assembly of claim 7, wherein the shield is made of a transparent material.

9. The flash assembly of claim 7, wherein the shield is made of transparent glass.

10. The flash assembly of claim 7, wherein the shield is made of transparent plastic.

11. The flash assembly of claim 7, wherein the shield is a bay window.

* * * * *